(12) United States Patent
Berwanger

(10) Patent No.: US 6,479,961 B1
(45) Date of Patent: Nov. 12, 2002

(54) STARTING SYSTEM FOR AN ELECTRIC MOTOR

(75) Inventor: Egidio Berwanger, Joinville SC (BR)

(73) Assignee: Empresa Brasileira de Compressores S/A-Embraco, Joinville-SC (BR)

( * ) Notice: Subject to any disclaimer, the term of this patent is extended or adjusted under 35 U.S.C. 154(b) by 0 days.

(21) Appl. No.: 09/673,163
(22) PCT Filed: Apr. 12, 1999
(86) PCT No.: PCT/BR99/00027
§ 371 (c)(1),
(2), (4) Date: Oct. 11, 2000
(87) PCT Pub. No.: WO99/53604
PCT Pub. Date: Nov. 21, 1999

(30) Foreign Application Priority Data

| Apr. 13, 1998 | (BR) | ............................................. 9801913 |
| Oct. 2, 1998 | (BR) | ............................................. 9806412 |

(51) Int. Cl.$^7$ ................................................. H02P 7/36
(52) U.S. Cl. ........................ 318/778; 318/753; 318/754; 318/767; 318/785; 318/787
(58) Field of Search ................................ 318/778, 753, 318/754, 767, 785, 787

(56) References Cited

U.S. PATENT DOCUMENTS

| 3,659,172 A | * | 4/1972 | Kuniaki et al. ............. 318/467 |
| 3,882,364 A | | 5/1975 | Wright et al. |
| 3,970,908 A | | 7/1976 | Hansen et al. |
| 5,343,019 A | * | 8/1994 | Nashida et al. ............. 318/467 |

FOREIGN PATENT DOCUMENTS

| DE | 23 15 567 | 10/1974 |
| DE | 195 34 423 A1 | 3/1997 |
| GB | 2 082 85 A | 3/1982 |

* cited by examiner

Primary Examiner—Karen Masih
(74) Attorney, Agent, or Firm—Darby & Darby

(57) ABSTRACT

A starting system for an electric motor having a main coil and an auxiliary coil which are supplied current by an electric current source in which a switch is connected between the electric current source and the auxiliary coil that has an open condition, in which the auxiliary coil remains de-energized by the electric current, and a closed condition for energization of the auxiliary coil with the electric current. An actuating system is positioned relative to the electric motor to receive the magnetic field produced by the motor main coil upon its energization by the electric current for operation of the electric motor that operates to close the switch in response to the magnetic field produced by the current passing through the motor main coil with an intensity above a determined minimum value, and opens the switch when the current through the main coil produces a magnetic field having an intensity of the determined minimum value.

18 Claims, 4 Drawing Sheets

STARTING SYSTEM FOR AN ELECTRIC MOTOR

FIELD OF THE INVENTION

The present invention refers to a starting system for an induction electric motor, particularly of the type used in refrigeration hermetic compressors.

BACKGROUND OF THE INVENTION

In the conventional constructions, an electric motor of the type mentioned above has a main coil and an auxiliary coil, which are supplied with electric current by an electric current source through a starting circuit of the electric motor usually comprising a starting relay or a thermistor (PTC) mounted in a case to be electrically connected to the external wall of the compressor shell in which this electric motor operates.

In these constructions, a terminal of each of the main and auxiliary coils of this electric motor is directly connected to the electric current source through a switch element of this starting circuit, whereas another terminal of the auxiliary coil is electrically connected to said electric current source through the starting relay or PTC.

In the construction using a starting relay, the excitation of a winding thereof leads to the magnetic closing of its contacts, allowing current to pass to the auxiliary coil of the electric motor. This energization condition remains while the current through the winding of the relay is sufficient to maintain the closing condition of its contacts. In general, just after start, when the current drops in the main coil of the motor, the current through the winding of the relay is substantially reduced, causing, not always in the desired occasion, the opening of the relay contacts and the interruption of the current passing through the auxiliary coil of the motor.

The use of a starting relay further has some disadvantages, such as the possibility of occurring melting of the relay contacts in a situation of high current discharge, possibility of electric interferences and sparking.

In the construction employing a starting PTC, upon start of the electric motor, the PTC allows electric current to pass to the auxiliary coil, this condition being temporarily maintained in function of the PTC characteristics. With the passage of electric current, the PTC temperature is altered and increases progressively. Upon heating, the PTC resistance is gradually increased, progressively impairing the passage of the electric current and consequently reducing the passage of said current to the auxiliary coil, such reduction occurring until the passage of the current to the auxiliary coil has been blocked. However, in practice, although gradually reducing the current through the auxiliary coil of the motor, the PTC resistance does not effectively interrupt the current supply to the auxiliary coil, allowing a residual current to remain therethrough, resulting in energetic consumption of the electric motor. Moreover, the existence of current flowing through the PTC keeps the latter heated, impairing new starts of the electric motor, since a restart should only occur when the PTC has a determined temperature in which there is no significant resistance to the passage of the electric current.

Besides the inconveniences resulting from the provision of a starting relay or a PTC for achieving the start of the electric motor, this conventional construction of providing the starting circuit with such elements externally to the compressor causes some inconveniences, such as undue heating of the case and consequently of the components mounted therewithin, difficulty and discomfort for assembling said case to the compressor and exposure of said case to impacts when the compressor is moved, for example during shipping, which may cause an undue disconnection of the case containing the starting circuit from the compressor shell.

DISCLOSURE OF THE INVENTION

Thus, it is an objective of the present invention to provide a starting system for an electric motor, which allows to dispense the use of a starting relay or a starting PTC in the starting circuit of said motor, in order to avoid the inconveniences resulting from the use of these components.

Another objective of the present invention is to provide a starting system for an electric motor of the above mentioned type, which may be mounted to a hermetic compressor without the inconveniences known in the prior art.

These and other objectives of the present invention are achieved by a starting system for an electric motor of the type comprising a main coil and an auxiliary coil, which are supplied by an electric current source, said system comprising: a switch provided between the electric current source and the auxiliary coil and having an open condition, in which the auxiliary coil remains deenergized, and a closed condition for energization of the auxiliary coil; and an actuating means provided inside the electric motor and submitted to a magnetic field produced by the main coil upon its energization for operation of the electric motor, said actuating means closing the switch when the current passing through the main coil produces a magnetic field with an intensity superior to a determined minimum value, and opening the switch when the current through the main coil produces a magnetic field presenting an intensity with the determined minimum value.

BRIEF DESCRIPTION OF THE DRAWINGS

The invention will be described below, with reference to the attached drawings, in which:

FIG. 8 shows, schematically and in a vertical cross-sectional view, part of a compressor to be used in a refrigeration system, illustrating the assembly positioning of the switch protecting element, illustrated in FIG. 7, below the coils of the electric motor of the compressor.

BEST MODE OF CARRYING OUT THE INVENTION

Figure 1:
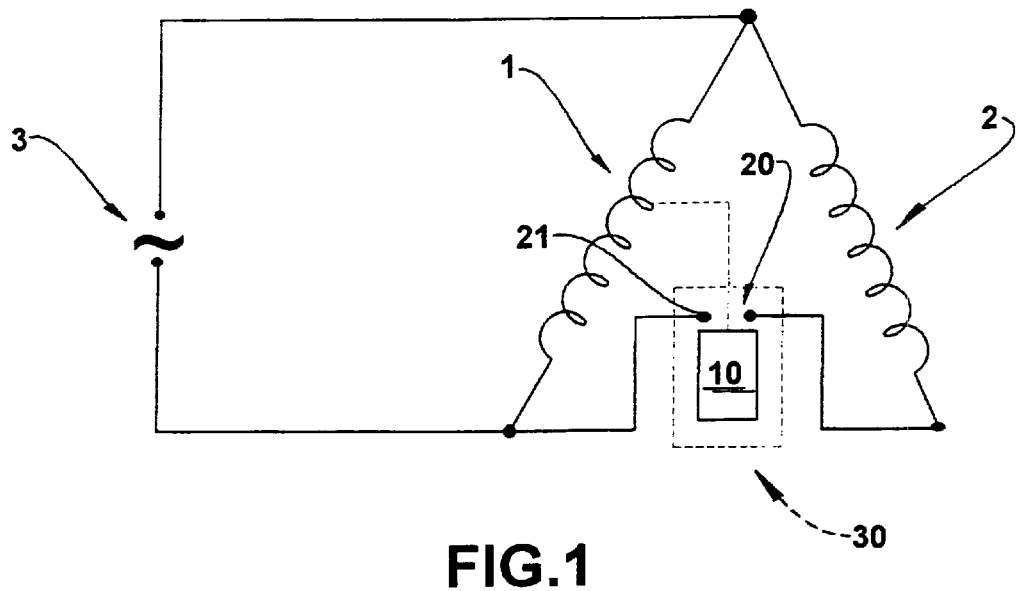
FIG. 1 shows, schematically, the main and the auxiliary coils of the electric motor, which are coupled to the starting system of the present invention, according to a constructive embodiment thereof.

The present invention will be described in relation to an electric motor of the type used in a refrigeration compressor, including a main coil 1 and an auxiliary coil 2, which are supplied by an electric current source 3, such as, for example, the electric network in alternate current.

During start of the electric motor, a starting current, with an intensity which is usually much higher than that of the normal operation current of the electric motor, is transmitted to the main coil 1 of the electric motor, generating an intense magnetic field. According to the known techniques, during start of the electric motor, the starting current activates a starting circuit, not illustrated, which allows the electric current to pass to the auxiliary coil 2 during a certain time interval, which varies in function of the conducting characteristics of the starting circuit, said current passage to the auxiliary coil 2 being generally interrupted when the current passing through the main coil 1 reaches a determined value, substantially corresponding to the normal operation current of the electric motor. The constructions including a starting circuit provided according to the prior art and externally mounted to a hermetic shell 4 of the compressor, where the electric motor operates, have the inconveniences discussed above.

According to the present invention and as illustrated in the appended figures, the energization of the auxiliary coil 2 of the electric motor occurs, during start of the latter, through an actuating means 10 operatively connected to both the auxiliary coil 2 and electric current source 3 and mounted inside the electric motor, in order to be submitted to the magnetic field generated by the current passing through the main coil 1, allowing the selective supply of the auxiliary coil 2 by the electric current source 3 when the intensity of the current passing through the main coil 1 results in an intensity of magnetic field superior to a determined minimum value which is usually reached during start of the electric motor.

The energization of the auxiliary coil 2 is maintained until the intensity of the current passing through the main coil 1 reaches a certain value to produce a magnetic field with the determined value, below which the auxiliary coil 2 is maintained deenergized.

The actuating means 10 consists for example, of a ferromagnetic core mounted within a stator of said electric motor in the central region of the main coil 1 thereof, preferably in one of four previously known electrically neutral points of the motor.

During start of the electric motor, the actuating means 10 is energized in order to conduct a switch 20, provided between the electric current source 3 and the auxiliary coil 2, from an open condition, in which the auxiliary coil 2 remains deenergized, to a closed condition, allowing said auxiliary coil 2 to be supplied with electric current (starting current), said closed condition being kept until the magnetic field has reached the determined minimum value.

When the current passes through the auxiliary coil 2, there is a reduction in the current passing through the main coil 1, also reducing the intensity of the magnetic field acting on the actuating means 10 and consequently on the switch 20. When the reduction of magnetic field reaches the determined minimum value, which is not sufficient to maintain the closed condition of said switch 20, the actuating means 10 will conduct the latter to the open condition.

In a constructive embodiment of the present invention (FIG. 1), the actuating means 10 acts mechanically on switch 20, in order to modify the conducting state thereof, altering its "closed" and "open" conditions.

Figure 3:
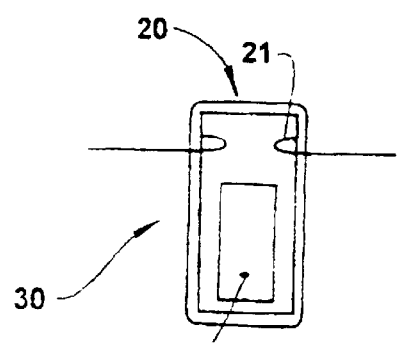
FIG. 3 shows, schematically, a construction for the starting system of the present invention.
Figure 4:
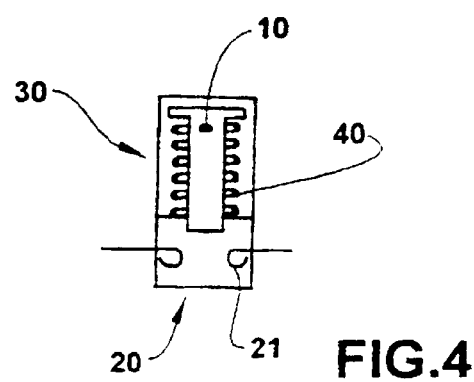
FIG. 4 shows., schematically, another construction for the starting system of the present invention.

In this construction, the actuating means 10 (FIGS. 3 and 4) defines a sliding means provided with a pair of contact terminals, each to be seated against a contact from a pair of mechanical contacts 21 which define the switch 20, when the latter is in its closed condition. In this condition, the contacts of the pair of contacts 21 are electrically connectable to each other by the actuating means 10.

The actuating means 10 of this construction is mechanically displaceable between an inoperative position, opening the switch 20 and maintaining its contact terminals spaced from the pair of contacts 21 of said switch 20, and an operative position, closing the latter by seating said contact terminals onto the pair of contacts 21 of the switch 20.

In this construction, the actuating means 10 and the pair of contacts 21 of the switch 20 are provided within a hermetic case 30 (FIGS. 3 and 4), electrically transparent, made of glass for example, in order to avoid the occurrence of sparks in the internal environment of the electric motor.

According to this construction, when the reduction of the magnetic field reaches a determined minimum value, insufficient to maintain the closed condition of said switch 20, the latter is conducted, through a return means acting by either the gravitational or spring forces, to its open condition. In the embodiment illustrated in FIG. 4, the return means is defined as a spring element 40.

In another constructive embodiment of the present invention (FIG. 2), the switch is in the form of a solid state element, such as an electronic element, for example a triac, which usually blocks the energization of the auxiliary coil 2 and selectively permits said energization to occur in the closed condition of switch 20.

The triac is electrically energized when the electric current passes through the main coil 1 of the electric motor which produces the magnetic field above the determined minimum value.

In this construction, each terminal of a pair of the triac terminals connects said triac to the auxiliary coil 2 and to the power source 3 respectively, whereas the actuating means 10 acts as a trigger for said triac, in order to energize it during start of the electric motor, supplying the triac with a certain electric current, which may be reduced until the portion between the terminals of said triac has been turned off, this condition being achieved when the magnetic field produced by the electric current passing through the main coil 1 presents the determined minimum value.

In this construction, the actuating means 10 comprises a transformer, whose primary is defined by the main coil 1 of the electric motor and the secondary by a windinq 11 having a terminal connected to the triac and defining the trigger thereof and through which passes an electric current induced by the starting current passing through the main coil 1 of the electric motor.

Figure 2:
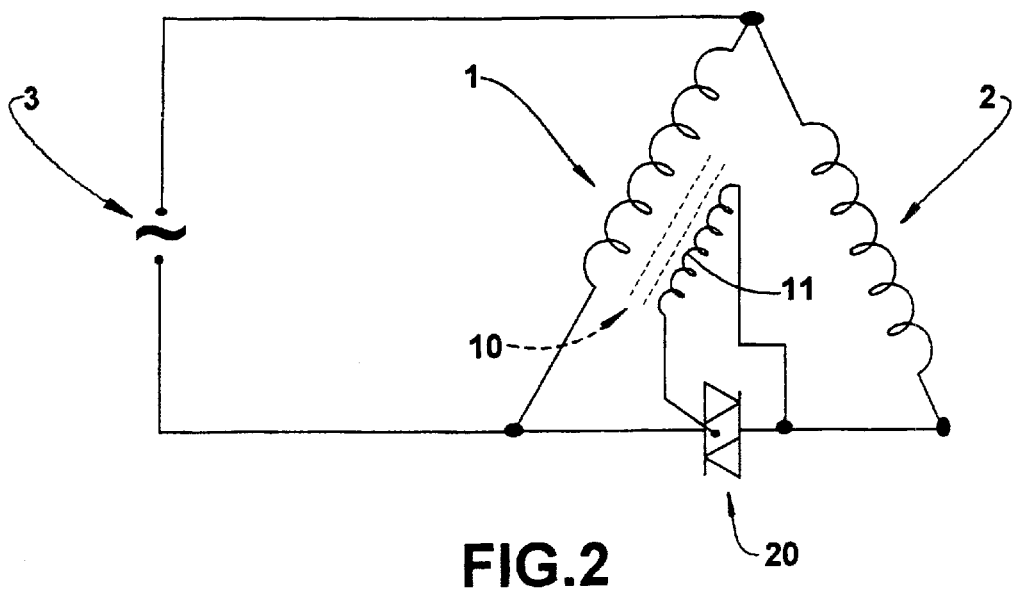
FIG. 2 shows, schematically, the main and the auxiliary coils of the electric motor, such as illustrated in FIG. 1, which are coupled to the starting system of the present invention, according to another constructive embodiment thereof.
Figure 5:
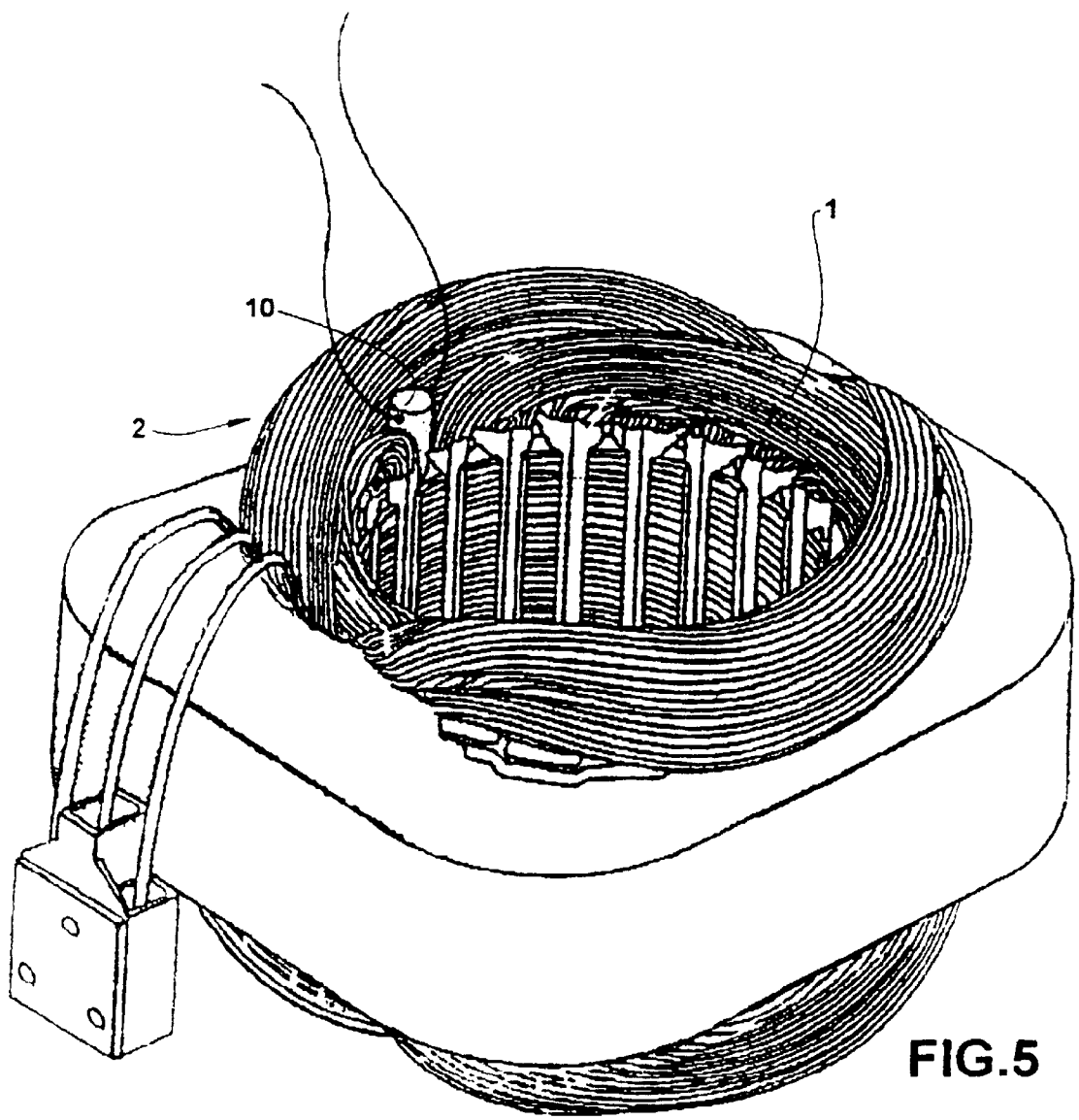
FIG. 5 shows, schematically and in a perspective view, the main and the auxiliary coils of an electric motor, illustrating the assembly positioning of the starting system of the present invention as illustrated in FIG. 3.
Figure 6:
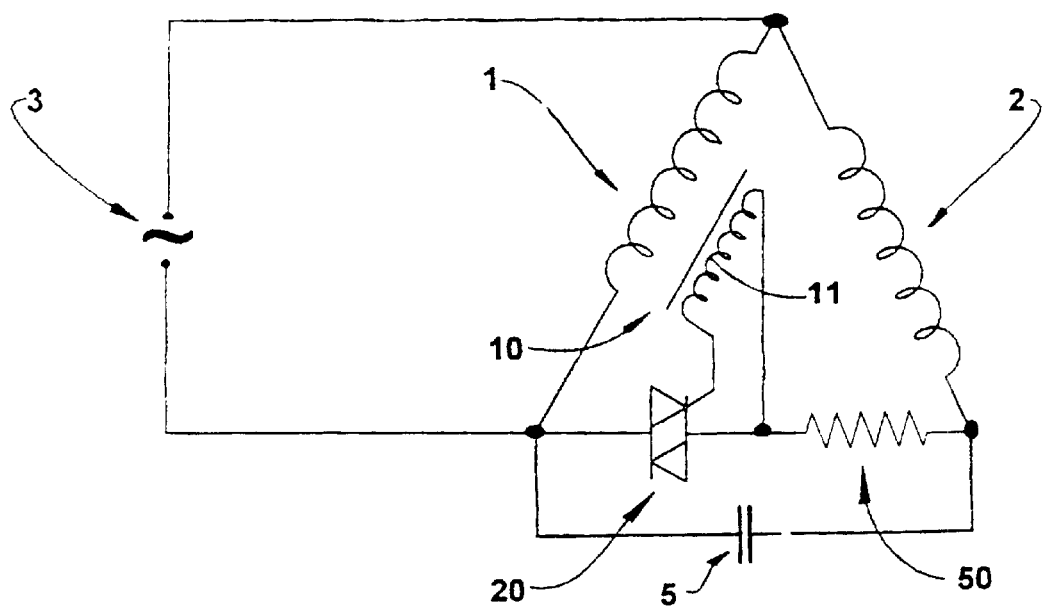
FIG. 6 shows, schematically, a constructive variant for the starting system of FIG. 2, illustrating a switch protecting element.

In a constructive variant of the present solution, illustrated in FIG. 2, the starting circuit of the electric motor having a switch 20, which is electronic, further comprises a permanent capacitor 5 FIG. 6) in series between the main coil 1 and auxiliary coil 2 and which increases the efficiency of he electric motor. In this construction, there is also provided, in series with the switch 20 and auxiliary coil 2, a protecting element 50, for example resistor, which reduces the starting current of the electric motor and protects the switch 20, if it is electronic, against accidental electrical discharges coming from the permanent capacitor 5.

Figure 7:
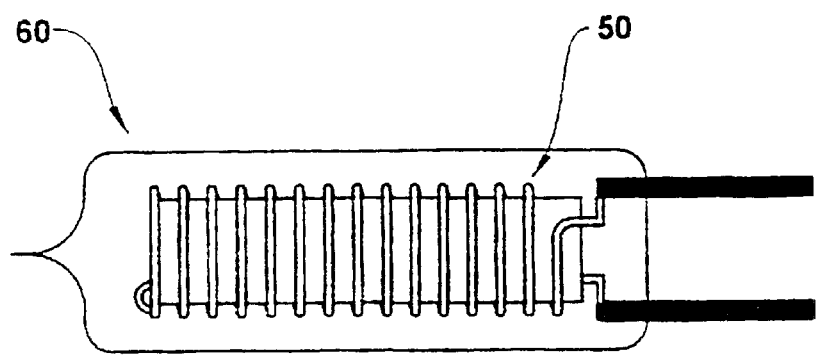
Figure 8:
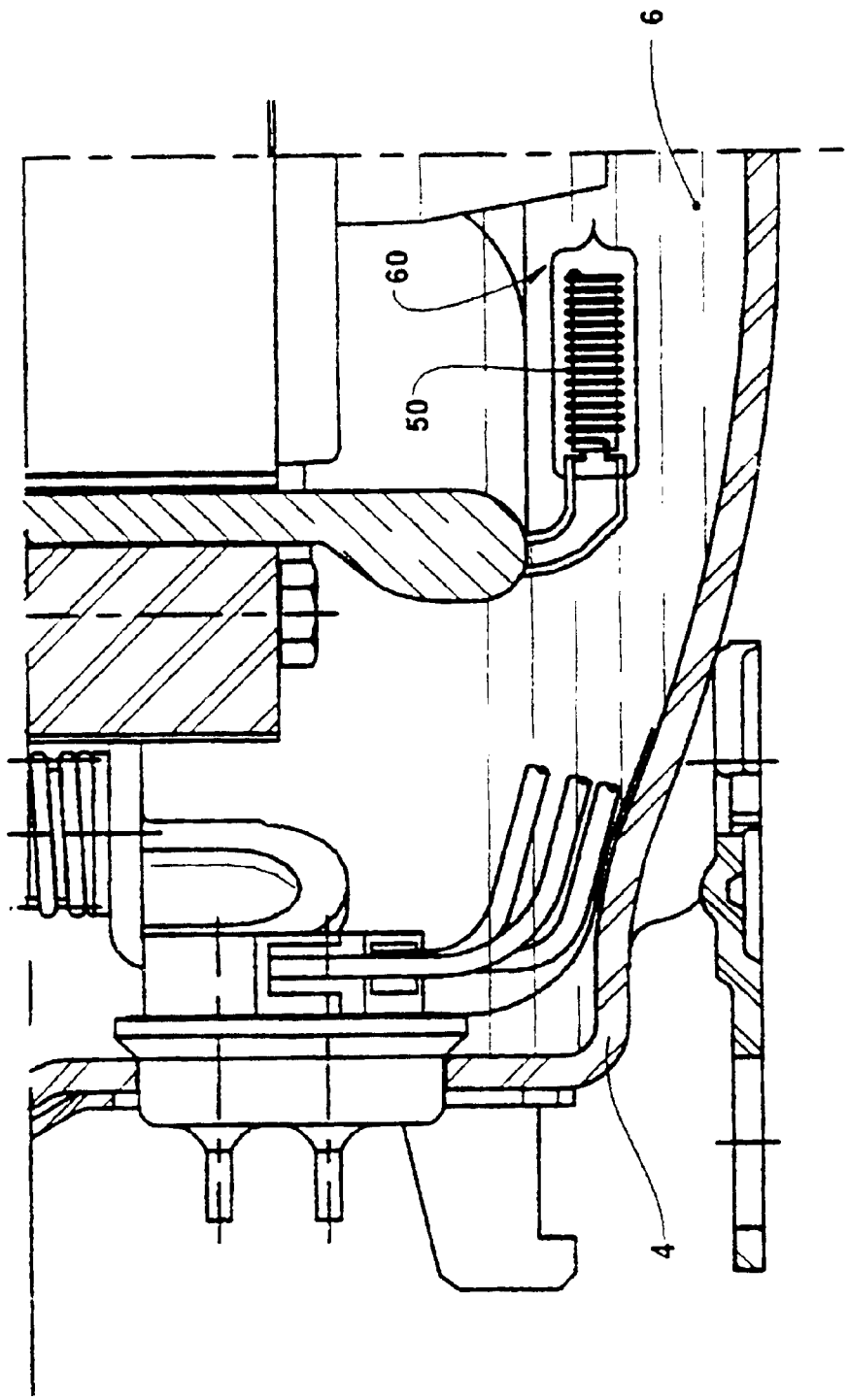
FIG. 8 shows, schematically, a construction for the switch protecting element illustrated in FIG. 6.

According to the present invention, the resistor 50 is provided inside a hermetic capsule 60 (FIG. 7), which is made of an electrically neutral material, such as transparent glass, and which is preferably immersed in the oil contained in an oil reservoir 6 defined within the hermetic shell 4 of the compressor in which the electric motor is provided (FIG. 8), in order to avoid that the heating of the resistor 50 affects other components in the starting circuit. This arrangement allows to dissipate high power and to maintain the internal temperature of the compressor at values compatible with those during operation of said compressor.

In the constructive embodiment in which the switch 20 is a solid state element or, as illustrated, the triac, the assembly of said switch within the hermetic shell where the electric motor is provided may occur, or example, in a cooler region of said shell, for example adjacent to the suction circuit of the refrigeration system of the compressor.

What is claimed is:

1. A starting system for an electric motor comprising:
    a main coil and an auxiliary coil which are supplied current by an electric current source;
    a switch connected between the electric current source and the auxiliary coil and having an open condition, in which the auxiliary coil remains de-energized by the electric current, and a closed condition for energization of the auxiliary coil with the electric current; and
    an actuating means positioned relative to the motor main coil to receive the magnetic field produced by the main coil upon its energization by the electric current for operation of the electric motor, said actuating means closing a switch in response to the intensity of the magnetic field produced by the current passing through the main coil exceeding a determined minimum value, and opening the switch when the current through the main coil produces a magnetic field having an intensity of said determined minimum value.

2. System, as in claim 1, wherein said actuating means is displaced between an inoperative position, opening the switch, and an operative position, closing the switch, the displacement of the actuating means to its operative position being achieved by said magnetic field having an intensity greater than said determined minimum value, and a return means to control the displacement to the inoperative position achieved by actuation of a return means on said actuating means when said magnetic field is of an intensity of said minimum value.

3. System, as in claim 2, wherein said return means is defined by the gravitational force on said actuating means.

4. System, as in claim 2, wherein said return means comprises a spring element constantly forcing said actuating means to the operative position for said switch.

5. System, as in claim 4, wherein said switch comprises a pair of mechanical contacts which are electrically connectable to each other by said actuating means when in the operative condition.

6. System, as in claim 5, wherein said actuating means and said pair of contacts are provided within an electrically insulated hermetic case mounted inside the stator of the electric motor.

7. System, as in claim 6, wherein said hermetic case is a capsule made of glass.

8. System, as in claim 1, wherein said actuating means is positioned in a central region of said main coil of the electric motor.

9. System, as in claim 2, wherein said actuating means comprises a transformer, whose primary winding is defined by said main coil of the electric motor, and a secondary winding operatively and electrically connected to said switch.

10. System, as in claim 9, wherein said switch comprises an electronic element, which is energizable by the output current of said transformer.

11. System, as in claim 10, wherein said switch comprises a solid state element.

12. System, as in claim 11, wherein the electric motor is applied to a refrigeration compressor and said solid state element is positioned within a hermetic shell of a compressor, spaced from the electric motor.

13. System, as in claim 12, wherein said solid state element is positioned adjacent to a suction circuit of the compressor.

14. System, as in claim 13, wherein said solid state element is a triac, which normally blocks the energization of said auxiliary coil and permits said energization to occur in the closed condition of said switch.

15. System, as in claim 14, further comprising a permanent capacitor provided between said main coil and said auxiliary coil in series therewith; and a switch protecting element connected in parallel to said permanent capacitor and in series with both said switch and said auxiliary coil.

16. System, as in claim 15, wherein said switch protecting element comprises a resistor provided within a hermetic capsule and mounted immersed in an oil reservoir inside the hermetic shell of the compressor.

17. System, as in claim 16, wherein said hermetic capsule is made of transparent glass.

18. System, as in claim 1, wherein said actuating means is provided within a housing of the motor.

* * * * *

UNITED STATES PATENT AND TRADEMARK OFFICE
CERTIFICATE OF CORRECTION

PATENT NO. : 6,479,961 B1
DATED : November 12, 2002
INVENTOR(S) : Egidio Berwanger It is certified that error appears in the above-identified patent and that said Letters Patent is hereby corrected as shown below:

<u>Title page,</u>
Item [87], PCT Pub. Date: delete "November 21, 1999" and substitute -- October 21, 1999 --

Signed and Sealed this

Twenty-ninth Day of July, 2003

JAMES E. ROGAN
*Director of the United States Patent and Trademark Office*